United States Patent
Subosits et al.

(10) Patent No.: US 12,459,528 B2
(45) Date of Patent: Nov. 4, 2025

(54) CUSTOMIZABLE CAR SETUP OPTIMIZATION AND STRATEGY BASED ON INDIVIDUAL DRIVING STYLE AND PREFERENCES

(71) Applicant: TOYOTA RESEARCH INSTITUTE, INC., Los Altos, CA (US)

(72) Inventors: John K. Subosits, Mountain View, CA (US); Yun Jung Lee, Mountain View, CA (US); Shawn Manuel, Mountain View, CA (US); Avinash Balachandran, Sunnyvale, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 236 days.

(21) Appl. No.: 18/476,789

(22) Filed: Sep. 28, 2023

(65) Prior Publication Data

US 2025/0108819 A1 Apr. 3, 2025

(51) Int. Cl.
*B60W 50/14* (2020.01)
*B60W 40/09* (2012.01)
(Continued)

(52) U.S. Cl.
CPC ............ *B60W 50/14* (2013.01); *B60W 40/09* (2013.01); *G06N 3/092* (2023.01);
(Continued)

(58) Field of Classification Search
CPC ................ B60W 50/14; B60W 40/09; B60W 2050/0029; B60W 2050/0083;
(Continued)

(56) References Cited

U.S. PATENT DOCUMENTS

| | | |
|---|---|---|
| 5,707,237 A | 1/1998 | Takemoto |
| 5,921,780 A | 7/1999 | Myers |

(Continued)

FOREIGN PATENT DOCUMENTS

GB  2631405 A  *  1/2025  ............. G07C 5/008

OTHER PUBLICATIONS

Taheri et al., "Virtual Reality Driving Simulation for Measuring Driver Behavior and Characteristics," Journal of Transportation Technologies, 7(2):122-132, Apr. 12, 2017 (https://doi.org/10.4236/jtts.2017.72009).

(Continued)

*Primary Examiner* — Ryan W Sherwin
(74) *Attorney, Agent, or Firm* — SHEPPARD, MULLIN, RICHTER & HAMPTON LLP; Daniel N. Yannuzzi

(57) ABSTRACT

Systems and methods are provided for determining vehicle configurations. The system can receive simulation data or actual driving data of a driving track corresponding to a driver and associate the simulation data or actual driving data with one or more driving parameters. A driver style can be determined based on the one or more driving parameters. A vehicle configuration can be determined for a vehicle of the driver based on the determined driver style. The system can display one or more vehicle settings associated with the vehicle configuration on a user interface.

20 Claims, 5 Drawing Sheets

(51) Int. Cl.
*G06N 3/092* (2023.01)
*B60W 50/00* (2006.01)

(52) U.S. Cl.
CPC ............... *B60W 2050/0029* (2013.01); *B60W 2050/0083* (2013.01); *B60W 2050/146* (2013.01); *B60W 2300/28* (2013.01); *B60W 2540/221* (2020.02); *B60W 2540/225* (2020.02); *B60W 2540/30* (2013.01)

(58) Field of Classification Search
CPC ....... B60W 2050/146; B60W 2300/28; B60W 2540/221; B60W 2540/225; B60W 2540/30; B60W 2050/0088; B60W 40/12; G06N 3/092
See application file for complete search history.

(56) References Cited

U.S. PATENT DOCUMENTS

| | | |
|---|---|---|
| 7,373,888 B1 | 5/2008 | Namanny |
| 8,894,414 B2 | 11/2014 | Campion |
| 10,269,260 B2 | 4/2019 | Ellis |
| 10,412,466 B2 | 9/2019 | Allen |
| 10,586,454 B2 | 3/2020 | Toyoda |
| 11,244,579 B2 | 2/2022 | Deakins |
| 2011/0202236 A1* | 8/2011 | Galasso ............... B62K 25/286 701/37 |
| 2015/0191178 A1* | 7/2015 | Roy ........................ H04W 4/48 701/36 |
| 2016/0025025 A1 | 1/2016 | Schöggl |
| 2018/0281797 A1* | 10/2018 | Berels .................. B60K 17/344 |
| 2020/0184849 A1* | 6/2020 | Spence ........... B60W 30/18145 |
| 2021/0237760 A1 | 8/2021 | Tucker |
| 2022/0024395 A1 | 1/2022 | Balcombe |
| 2022/0319246 A1* | 10/2022 | Goto ..................... B60W 50/14 |
| 2023/0182713 A1* | 6/2023 | Pettersson ............. B60W 20/18 701/22 |
| 2024/0132079 A1* | 4/2024 | Medina ............ B60W 50/0097 |

OTHER PUBLICATIONS

Taheri et al., "Development of a Driving Simulator with Analyzing Driver's Characteristics Based on a Virtual Reality Head Mounted Display," 7(3):351-366, Jul. 27, 2017 (https://doi.org/10.4236/jtts.2017.73023).

Kuefler et al., "Imitating Driver Behavior with Generative Adversarial Networks," 2017 IEEE Intelligent Vehicles Symposium (IV), Jun. 2017, pp. 204-211 (https://doi.org/10.1109/IVS.2017.7995721).

* cited by examiner

CUSTOMIZABLE CAR SETUP OPTIMIZATION AND STRATEGY BASED ON INDIVIDUAL DRIVING STYLE AND PREFERENCES

TECHNICAL FIELD

The present disclosure relates generally to driving strategies around a race track, and in particular, some implementations may relate to customizing a vehicle in preparation for the race track.

DESCRIPTION OF RELATED ART

Motorsports racing showcases the pinnacle of automotive manufacturing and driving skills, and optimizing lap times and improving racing results has long been one of the largest challenges in motorsports. Racing teams record a large amount of data about the vehicles and drivers to determine strategy for a particular race. In particular, this data can be used to generate simulations of a race to provide a visual aid for strategizing. These simulations can apply machine learning models that can focus on vehicle parameterization or race line optimization to generate recommendations for a vehicle and/or driver.

BRIEF SUMMARY OF THE DISCLOSURE

According to various embodiments of the disclosed technology, a method for determining vehicle configurations can comprise receiving simulation data or actual driving data of a driving track corresponding to a driver; associating the simulation data or actual driving data with one or more driving parameters; determining a driver style based on the one or more driving parameters; determining a vehicle configuration for a vehicle of the driver based on the determined driver style; and displaying one or more vehicle settings associated with the vehicle configuration on a user interface.

In some embodiments, the one or more driving parameters comprise level of aggression, preference for corners, passing preferences, and driver experience.

In some embodiments, the method further comprises comparing the simulation data or actual driving data with driving data associated with an expert driver.

In some embodiments, the actual driving data comprises biometric data.

In some embodiments, the biometric data comprises heart rate, perspiration rate, and eye movement.

In some embodiments, determining the vehicle configuration is based on minimizing a lap time around the driving track.

In some embodiments, the vehicle configuration corresponds to a different driving track.

In some embodiments, the method further comprises training a reinforced learning model based on the vehicle configuration.

According to various embodiments of the disclosed technology, a method for determining vehicle operating characteristics can comprise receiving simulation data or actual driving data of a driving track corresponding to a driver; associating the simulation data or actual driving data with one or more driving parameters; determining a driver style based on the one or more driving parameters; comparing the driver style to expert driving data; determining a vehicle configuration for a vehicle of the driver based on the comparison; and displaying one or more racing strategies associated with the vehicle configuration on a user interface.

In some embodiments, the one or more driving parameters comprise level of aggression, preference for corners, passing preferences, and driver experience.

In some embodiments, the actual driving data comprises biometric data.

In some embodiments, the biometric data comprises heart rate, perspiration rate, and eye movement.

In some embodiments, determining the vehicle configuration is based on minimizing a lap time around the driving track.

In some embodiments, the method further comprises training a reinforced learning model based on the one or more racing strategies.

According to various embodiments of the disclosed technology, a non-transitory machine-readable medium can have instructions stored therein, which when executed by a processor, causes the processor to: receive biometric driving data of a driving track corresponding to a driver; associate the biometric driving data with one or more driving parameters; determine a driver style based on the one or more driving parameters; determine a vehicle configuration for a vehicle of the driver based on the determined driver style and a minimal lap time around the driving track; and display one or more vehicle settings associated with the vehicle configuration on a user interface.

In some embodiments, the one or more driving parameters comprise level of aggression, preference for corners, passing preferences, and driver experience.

In some embodiments, the instructions further cause the processor to compare the biometric driving data with driving data associated with an expert driver.

In some embodiments, the biometric driving data comprises heart rate, perspiration rate, and eye movement.

In some embodiments, the vehicle configuration corresponds to a different driving track.

In some embodiments, the instructions further cause the processor to train the reinforced learning model based on the vehicle configuration.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
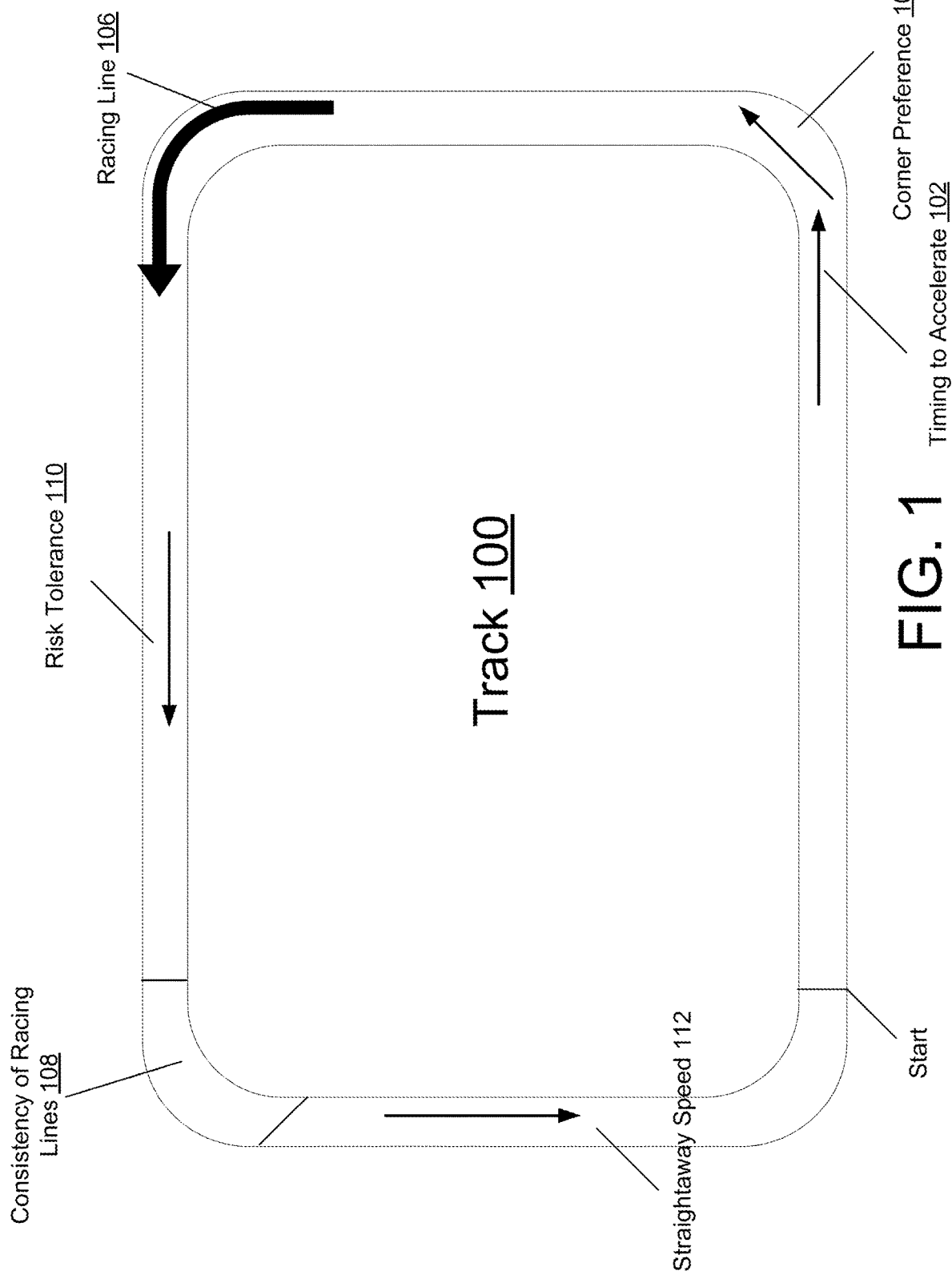
FIG. 1 illustrates an example driving track with corresponding driver decisions.

The figures are not exhaustive and do not limit the present disclosure to the precise form disclosed.

DETAILED DESCRIPTION

Racing teams can collect a large amount of data. This data can reflect parameters of a particular vehicle, such as vehicle state, speed, braking speed, or other parameters affecting the vehicle's performance. Vehicle data can be used to generate simulations of a driver's trajectory around a particular race track. These simulations can evaluate vehicle parameters and generate recommendations in the form of recommended vehicle configurations or recommended racing strategies. Unfortunately, these simulations can dilute the intricacies of a driver's preferences, driving style and personality. For example, a simulated trajectory may minimize the lap time around a track, but it may not be suitable for a driver's preferred speed to enter a corner or level of aggression against other drivers.

Embodiments of the systems and methods disclosed herein can provide recommendations for vehicle setup and racing strategies not only based on conventionally available data such as vehicle data and environmental data, but also actual driver data and a model of the driver that indicates driver's particular driving style. Driver's data can include but not limited to: biometric data such as heart rate, gaze, perspiration, Electroencephalography (EEG) signals; driver's vehicle commands such as: throttle and brake input, clutch operation, and steering angle, and steering rate; situational information that captures interaction with other drivers, such as a trajectory of two cars when passing, or one car blocking the other's attempt to pass; information related to race strategy, such as: the number of pit stops and pit stop timing, average time of each pit stops, fuel consumption history and projection, and average temperature of tires. This data can be associated with one or more parameters indicating an individual driver's style, or a model of a driver. For example, a driver's style may either implicitly or explicitly comprise their choice of racing lines or different commands such as choosing to use lower gears to gain traction around certain corners. Driving data, together with the model of driver's style, make up a driver model that replicates individual driver's driving style and preference.

The driver model can either take an explicit form of objective function that a driver's mental model optimizes for, or be modeled as an system identifiable through regression, or use a black-box model using approaches such as neural networks. The driver model can be input into one or more machine learning algorithms to generate recommendations for optimal vehicle setup and racing strategy. Here, vehicle setup can refer to vehicle settings that can be tuned or adjusted based on the driver's style. Recommendations on vehicle setup can comprise changing the front toe angle to increase stability at the expense of straight line speed; or lowering the car to increase downforce at the risk of getting too close to the ground and thus damaging the vehicle during aggressive maneuvers. Racing strategy can include, but is not limited to, predicting the number of safety cars in the race, pit stops, and tire management. The driver model can be constructed either using real vehicle data or driver-in-the-loop simulation data, in which the vehicle is set up differently to reveal driving preference. Such setups may include understeer setup, oversteer setup, and stiffer suspension setup.

The machine learning algorithms can make recommendations on vehicle setup and race strategy by simulating thousands of make-believe driving scenarios by incorporating the driver model. Different permutations of simulations can include understeer setups with different sets of tires to see which tires the driver would feel most comfortable and therefore perform the best. The machine learning algorithms may be trained using reinforced learning or bayesian inference algorithms that can infer the most favorable vehicle settings and race strategy to account for the driver's style. These recommendation algorithms can output suggested vehicle setup on a user interface by listing an optimal setup for the vehicle. For example, the wheels may be configured to drift around a turn at a certain radius or speed. As another example, the vehicle may be configured to brake at a certain force in accordance with the driver's preferred braking force.

The recommended vehicle setup can be sent to the vehicle so that the settings can be changed to be consistent with the recommendations. This pipeline may include a display showing recommendations, online adjustable systems such as air suspension and hydraulic sway bars, or automatic work order generators to be sent to the shop. Recommendation systems can include a mediation system so that the driver or other users, such as the race engineer, may alternatively alter vehicle settings manually after viewing the recommendations on a user interface. Similarly, the driver or other user can view racing strategies on the user interface to plan an upcoming race.

FIG. 1 illustrates an example track 100 and how a particular driver may traverse the track (e.g., aggressiveness, speed of travel in particular sections of the track, etc.). Data can be collected either from a driver-in-the-loop simulation or from a real vehicle. This data can indicate various driver preferences as a driver operates a vehicle or as evidenced by data accumulated from a driver's actions during race simulations of a vehicle. For example, a driver may take a higher risk by putting one wheel slightly off the track to drive a tighter line. Vehicle data on a driver's racing line choice can be collected to indicate the driver's choice of racing line 106, and the driver's consistency of racing lines 108 can be inferred from several trial laps on the same track. If the driver is not consistent with their racing lines lap by lap, such inconsistency can be indicative of driving skill and therefore can be a part of the driver's model representation.

As a driver reaches a corner or a turning point in the track, driver data and/or vehicle data can be collected indicating a driver's corner preference 104. For example, driver data may indicate that a driver may prefer entering the corner at a particular speed to start turning the wheel, followed by acceleration at their preferred apex. In addition to brake timing and brake force, steering rate and acceleration timing, biometric data—such as where the driver looks or how much tension there is when turning the wheel—can be included. Corner preference 104 can thus instruct on various vehicle settings, such as caster or camber setup on steering or suspension setup for certain driving styles. As with acceleration, driver data can indicate the consistency 108 of how a driver turns corners based on the variance in trajectory, speed, and/or turning radius.

Around the corners or in overtake situations, driver data can indicate the driver's risk tolerance 110. This risk tolerance can be represented by levels such as high, medium or low, or continuous values between 0 and 1. Risk tolerance 110 may be divided into sub-parameters based on driver data such as how closely the driver puts their wheels towards the edge of the track or to other vehicles, acceleration in close proximity to another vehicle, or other factors that make up risk tolerance 110. Vehicle data related to aggression 110 can include speed, braking force, steering rate, motion data identifying the distance between vehicles, or current vehicle setups, as well as driver's biometric information such as heart rate or tension on the driver's arms.

Straightaway speed 112 can also be measured by driver or vehicle data. Straightaway speed can be measured from vehicle data including the point where the driver starts accelerating, the top speed on the straightaway, the position where the driver starts to decelerate, and/or how quickly the driver decelerates. In terms of driver data, the driver's preferred position on the track can be measured to determine the driver's preference in traversing the straightaway. For example, a driver might prefer to drive along the outer edge of the track on the straightaway. If the driver's position is not consistent, driver data can indicate that the driver does not prioritize the location on the straightaway and may focus more on the straightaway speed. The elements of FIG. 1 illustrate example elements that can affect a driver's style. These elements do not limit the make up of the driver's style and can include other parameters, as further described below in FIG. 3.

Figure 2:
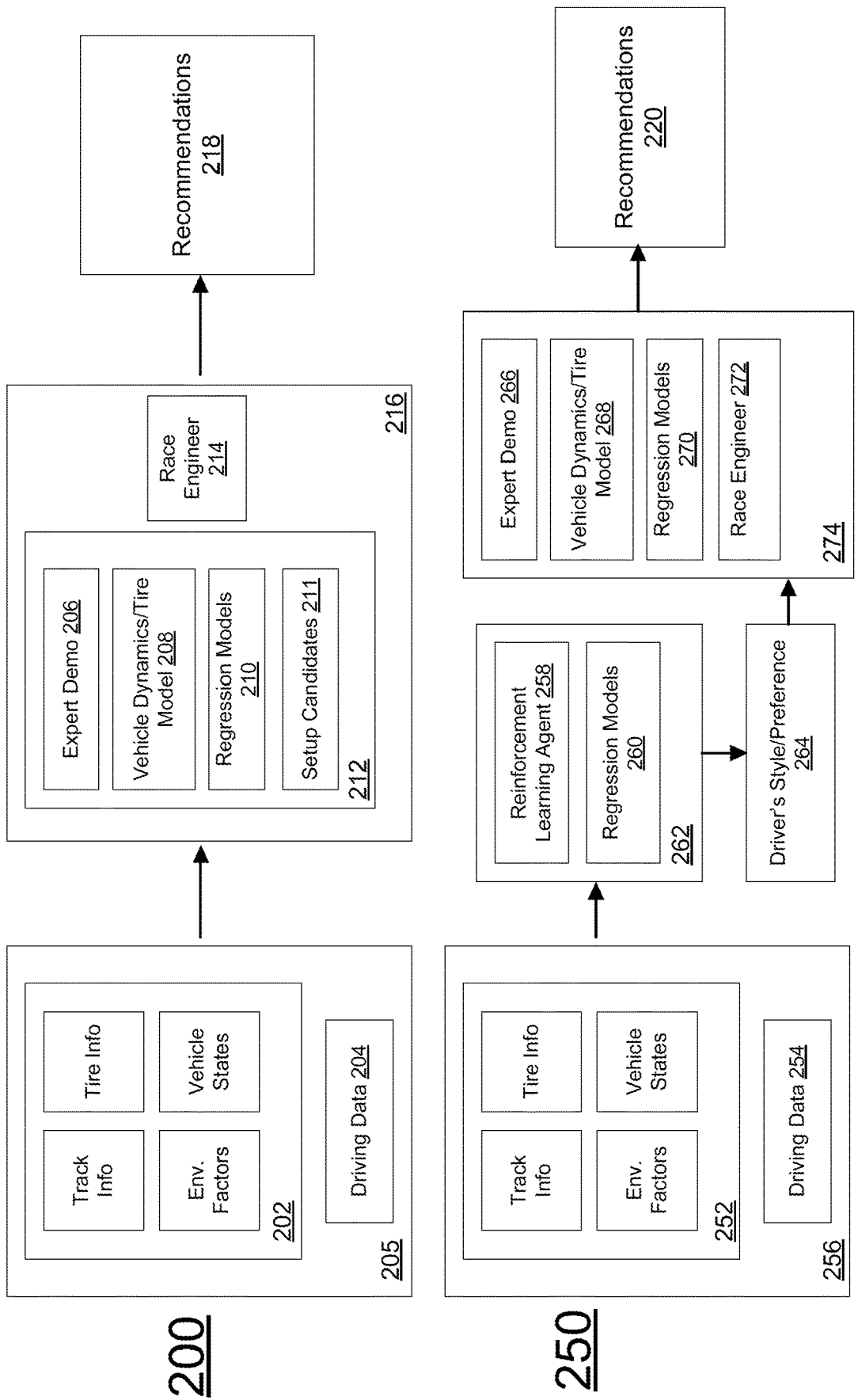
FIG. 2 illustrates an example workflow in accordance with one embodiment.

FIG. 2 illustrates an example workflow comparing traditional systems with embodiments of the present invention. Workflow 200 illustrates a traditional system, while workflow 250 illustrates embodiments of the present invention. Workflow 200 illustrates how recommended vehicle configurations are generated when limited to vehicle data. Block 205 shows the inputs to the vehicle setup and race strategy recommendation algorithms. Block 202 includes example variables that remain constant over the course of the race: Track Information can include the information about the track, track edges, roughness of the track, positional information (GPS coordinates, altitude, banking of the road, etc.); Tire information can include the brand of the tire and softness, tire conditions and other characteristics such as friction coefficients, thermal profile, cornering stiffness and any other information made available by the tire manufacturer. Vehicle states can include the model of the vehicle, as well as powertrain and other setup information that can define the adjustable limits. Environmental factors can include temperature, relative humidity, wind and visibility. At block 204, driving data can comprise a series of recorded data from practice laps, either on a real vehicle or a simulation vehicle. This driving data can include GPS coordinates, vehicle states such as longitudinal and lateral velocity, longitudinal and lateral acceleration, engine rpm, and commands made by the driver, such as clutch, throttle, brakes and steering. Block 202 and 204 illustrate examples of block 205, inputs to the vehicle setup and race strategy recommendation algorithm.

Block 216 illustrates the conventional way of how vehicle setup and race strategy recommendations are done. The race teams may opt to employ a kind of setup optimization algorithm, shown at block 212. A setup optimization algorithm may include a series of demonstrations from the expert (block 206), mathematical models (block 208) and vehicle setup and race strategy candidates to query about (block 211) and/or inference models to recommend one setup/ strategy over another (block 210). Expert demo 206 can look similar to driving data 204, except that the data was collected from another driver or a mathematically optimized reference. Block 208 can include vehicle dynamics models and tire models, as well as the vehicle's aerodynamic model and thermal model of the tires. Inference models at block 210 can include any regression algorithms or Bayesian models, or neural network models. In addition to an optional setup optimization algorithm, race teams work with a race engineer shown at block 214, who is experienced in analyzing telemetry data and identifying areas of improvements in both the vehicle and the drivers themselves, while adhering to rules of the race.

A series of recommendations for vehicle setup can be generated as illustrated at block 218. These recommendations can comprise a listing of vehicle settings or race strategies. These settings can assist in accomplishing the goal of minimizing the lap time and/or matching the expert driver. While recommendations 218 may optimize the race in the ballpark, it can lack the personalization element. It is well known in racing that drivers who feel comfortable in their own vehicles and about the race also perform well. However, recommendations 218 rely on understanding driver's psychology and comfort level to experience and familiarity with the driver of the race engineer 214. For example, there might be a particularly aggressive driver starting right behind the team's driver, and the race is expected to happen on a rainy day on a track that the team has historically underperformed. If the race engineer fails to read the pressure on the team's driver, the team might opt to set up the vehicle to gain time early on behind the aggressive driver, by opting to use soft tires for the laps Another race engineer might bank on a possibility of safety cars on a rainy day, and may decide to direct the race more carefully instead of running higher and arguably unnecessary risks. Recommendations 218, based purely on mathematical models and intuition of the race engineer, can easily miss such intricacies of race and significance of psychological factors on the driver.

Workflow 250 provides some key differences from workflow 200. At block 252, similar parameters affecting vehicle performance can be determined based on vehicle sensor data. Driver's driving data, shown at block 254, may incorporate a wider range of data such as pre/post practice interview questionnaires. The critical difference is at block 262, which illustrates the driver's style modeling algorithm. This algorithm may be implemented more as a block box approach, such as a reinforcement learning (RL) agent (Block 258), or regression models (Block 260). Alternatively, illustrated below in FIG. 3, the driver's style may incorporate explicit parameters that can impact how to best optimize a vehicle The driver's style model is a representation of any driver's preferences in vehicle setup, driving style, race strategy, and the consistency of those preferences. The driver's style can be modeled from vehicle data and driver data, as well as environmental factors. Driver data can include, but is not limited to, biometric data such as perspiration rate, heart rate, eye movements, hand movements, and/or facial expressions. Individual driver data can also indicate the driver's various preferences at one or more actions during a race. For example, the steering wheel angle sensor can illustrate whether the driver prefers to command a general turn over the corner, as opposed to a series of sharp yaw rate change requests. Driver data can also arise from environmental data. For example, audio communications between members of a racing team can be recorded to determine preferences. The audio communications may indicate that the driver is advised to pass a vehicle aggressively, or follow at a certain distance. Racing teams already record this data for strategic purposes, so this data can be easily transferred to the system to be configured as driver parameters and parameters affecting vehicle performance.

Figure 3:
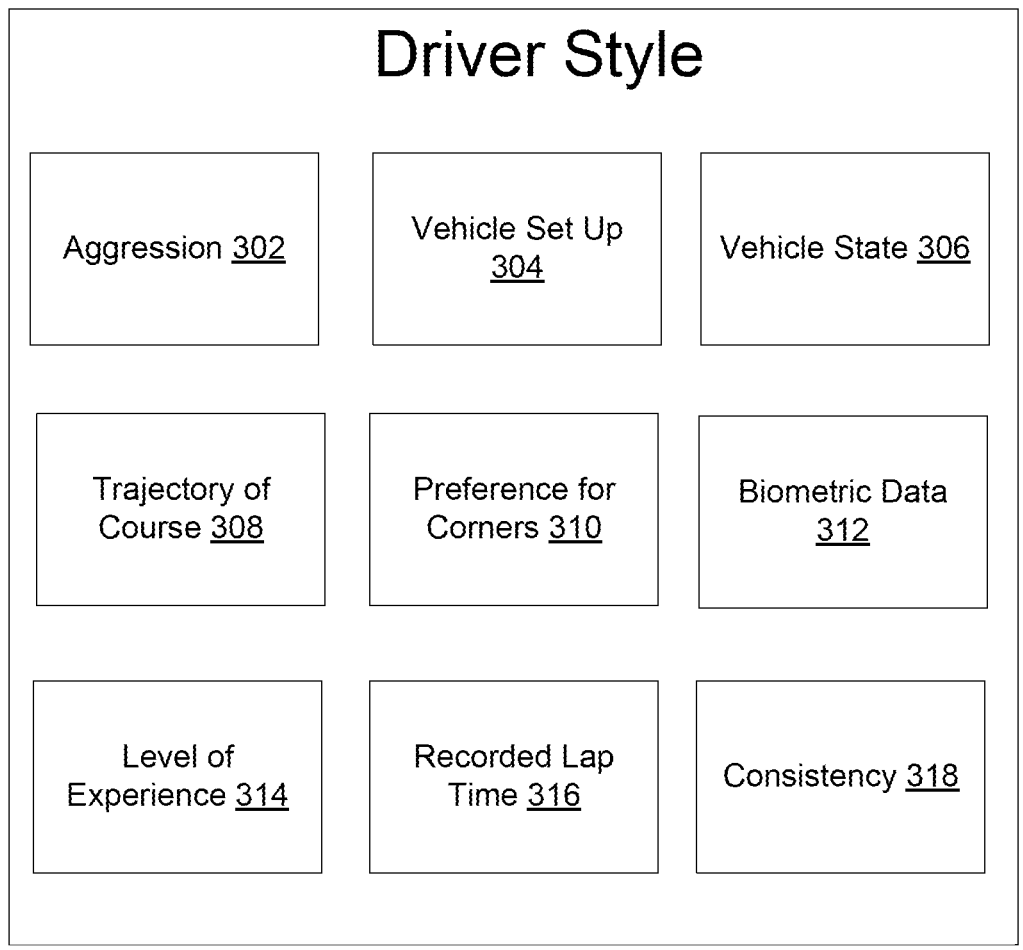
FIG. 3 illustrates example parameters for determining a driver's style in accordance with one embodiment.

At block 262, vehicle states, environmental factors, as well as driver's driving data and optionally, pre-post interviews can be input into one or more driving style models. At block 258, the machine learning/reinforcement learning models can be trained to learn the driver's level of expertise and style given a number of demonstrations. At block 260, an explicitly parametric model can be used to learn the driver's preference and style and the parameters can be tuned and learned to match the driver's style. For example, the parametric model may have hand-engineered features such as "aggression", "left/right preference" as shown in FIG. 3, and weightings on each parameter can be tuned either offline or online. The driving style models can either be trained entirely offline using pre-recorded data, or a generalized model trained off-line can be fine-tuned online as the driver completes the practice. The models can include meta-learned driver models previously trained on other drivers, or the same driver's data from another day, or in another car. The driver model can be tailored to one specific track at a time for increased accuracy of the parameters. In some embodiments, the models can incorporate meta learning to adjust parameters for various different racing tracks, in various car setups. The driver models can incorporate the mistakes or consistency of the particular driver to evaluate the success of a particular strategy. The driver models can weigh certain driving styles in making these evaluations. The model can be trained and updated with additional vehicle and driver data as necessary. At block 220, the system can provide recommendations for vehicle setup and racing strategies based on the set up recommendation algorithm, described in block 274. These recommendations can be similar in format to those of block 218; however, these recommendations can be tailored to an individual driver. As with block 216, setup recommendation frameworks at block 274 take in input block 256, which is similar to block 205. Critically, however, process 250 takes in the driving style model, 264, as the input to the setup recommendation algorithm, 274, in addition to typical input to the recommendation algorithm 256. The resulting recommendations 220 are specific to each driver and are more tailored to each driver's liking. The system can take the recommendations for a particular racing track and determine how the driver would act in a different racing scenario. The system can also generate simulated driving data based on different vehicle setups and strategies to evaluate a driver's performance while accounting for the driver's personal style.

The system may provide a listing of vehicle settings that allow a driver to execute actions based on personal preference. These settings can include different brake bias for a driver who would prefer to drive a slightly oversteer-prone car to pretty much drive itself through slow corners and remain stable in high speed corners, as opposed to less brake bias in the rear tires so that the cars can be more predictable. Alternatively or in addition, the system can provide racing strategies for the driver to follow as the race progresses. For example, a strategy may suggest passing vehicles at certain points in the race or when to make pit stops. In another example, for a fast driver with poor tire management, the strategy may utilize a higher chance of safety car instead of taking additional pit stops.

The recommended setup or racing strategies can be displayed on a user interface so that vehicle settings can be adjusted. The recommendations can be displayed on any user interface, including on an online interface, a mobile application, computer software, GPS, or other display. The user interface can be explainable, generative, and/or interactive to guide a user to an appropriate setup or racing strategy. For example, the user interface may suggest scenarios, recommendations as well as explanations, corresponding to a particular recommendation. The user interface may prompt a user or driver with phrases such as "Did you think the car was stable despite its natural oversteer at turn 2 from your previous run;" "make the following changes, because these changes will help with this portion of the previous run;" or "Do you think you can make these tires last for the remainder of the race." Recommendations can be given in terms of layman's language and/or provide additional detail on vehicle dynamics if prompted. The user may respond to questions either in a conversational format, or by selecting answers from multiple choices. Upon completion of the questionnaire, recommendations can either be automatically set up and loaded in a simulation vehicle, or can be physically delivered for the mechanic team to work on.

The user interface may also assist in collecting data to update the machine learning models and/or train the driver in the form of one or more simulations. For example, the user interface may simulate driving along the track for fifteen to thirty minutes. The driver can participate in the simulation to accumulate additional vehicle and driver data. The system can also generate additional simulation data from the driver's model to imitate the driver's actions in various situations. For example, a simulation may correspond to the situation where the driver needs to pass a vehicle at a certain corner given a new vehicle setup. Another simulation may correspond to a race during rainy weather, which can replicate a driver's preferences as applied to a rain scenario. The system can generate as many examples of driver behavior as needed to replicate the driver's preferences. The user interface may interact with the driver and generate trial runs and/or drills to try out the recommended setup and racing strategies. The recommendations can be updated based on how the driver performs during the drills. For example, during a drill, a driver may indicate that it is too challenging to execute a certain turning style with the recommended vehicle setup. The system can update the recommended vehicle setup based on the driver's performance. The system can obtain additional information as needed from the driver and update and/or train the one or more machine learning models. This allows the driver to continuously interact with the system and allow the system to further tailor recommendations to the driver's preferences.

FIG. 3 illustrates a series of sub-parameters that can affect the driver's style as illustrated in FIGS. 1 and 2. These parameters can be affected by vehicle and/or driver data. As described above, aggression 302 can be represented by levels such as high, medium or low. Aggression may be divided into further sub-parameters based on driver data such as the frequency a driver will try to pass a vehicle, following distance, acceleration in close proximity to another vehicle, or other factors that make up aggression. Vehicle data related to aggression can include speed, braking force, motion data identifying the distance between vehicles, or other vehicle operating characteristics.

Vehicle set up 304 can indicate how a driver prefers to setup the vehicle. This can be determined from driver data including preferred brake bias, suspension and sway bar stiffness, among others. These parameters, such as the amount of remaining fuel, can also be gleaned from vehicle sensor data by reviewing vehicle data indicating which settings are active. Vehicle setup 304 can incorporate vehicle sensor data as needed to further refine sub-parameters indicating the physical makeup of the vehicle. Similarly, vehicle state 306 can indicate the state of the vehicle's health, reliability of major components such as the engine and the transmission in the powertrain. For example, pyrometers of each tire can estimate how much life is left in the tire, as well as how much grip the driver can utilize. In another example, the race team might have had issues with cooling down the engine during the current season, and may monitor the radiator temperature. The vehicle state can also reflect different scenarios such as different tires, compromised vehicle components (such as splitters, canards, or bumpers) and/or other situations outside of "normal" operation. Vehicle state 306 can include driver data indicating a driver's comfort operating in the particular vehicle state, such that a particular race strategy and vehicle setup may be recommended. For example, a driver may be particularly good at managing tires to save themselves a pit stop. The recommended vehicle setup may take advantage of this preference and skillset by opting for softer tires in the beginning.

The trajectory of course 308 can indicate a driver's trajectory around a track or portion of a track. Trajectory can be obtained from vehicle GPS data and/or can be determined from driver data based on trends in a driver's actions as they traverse the track. As the driver traverses around a track, a trajectory can be generated to illustrate the vehicle's position on the track. The more laps the vehicle takes, the more trajectories can be generated. This plurality of trajectories can be used to isolate a driver's preferred trajectory. As described above, this can extend to specific situations on a track such as a corner or straightaway. For example, a driver's multiple laps around a corner may show that the driver tends to choose a mid-track exit as opposed to a late exit. The more laps a driver takes or simulates, the more data is available to the system to further tailor the preferred trajectory.

As described above, as a driver reaches a corner or a turning point in the track, data can be collected indicating a driver's corner preference 310. Vehicle data indicating corner preference 310 can comprise sensor data such as the turning of the wheels, the speed of the vehicle, or the physical tilt as the vehicle turns the corner. Corner preference 310 may include a corner trajectory to visually depict how a vehicle traverses a corner.

Biometric data can comprise driver data indicating physical or emotional characteristics of the driver. This data can include facial expressions, heart rate, perspiration rate, eye movements, hand movements, and/or body posture. This driver data can indicate how a driver feels about a particular situation or driving setup. For example, if a driver's facial expression suggests that the driver is afraid, the system can indicate that the driver is not comfortable with a particular driving situation. On the other hand, if a driver's heart rate and perspiration rate are low, the driver may find a particular task to be easy (i.e. pushing the vehicle at its limits around a corner despite a rather unstable vehicle, passing a competitor on a straightaway, etc.). The biometric data can provide physical indicators of the driver's feelings to further tailor the driver's preferences.

Level of experience 314 can indicate the driver's level of experience with a situation, the track, or overall racing. As with biometric data 312, level of experience can indicate a driver's comfort with a particular situation. Furthermore, the level of experience may indicate how to compare the driver's actions to an "expert" driver. Driver data indicating a driver's experience can include survey data or biometric data (indicating the driver's comfort). A more experienced driver may be able to closely match an expert driver's simulation and thus can further optimize the lap time. Recorded lap time 316 can indicate the driver's experience, comfort with the track, and relative success when racing around the track.

As described above, consistency 318 can indicate a driver's comfort executing a particular maneuver. Consistency can also indicate how a driver prioritizes a particular maneuver. As described above, if a driver is not consistent in position on a straightaway, the system can indicate that the driver does not care about position on the straightaway and may instead focus on speed. Consistency can be considered for any aspect of the driver's style as an indicator of how much a driver focuses on that parameter. Parameters 302-318 can together form a profile or model representing the driver's style. Parameters 302-318 may vary and include additional or less parameters as necessary.

Figure 4:
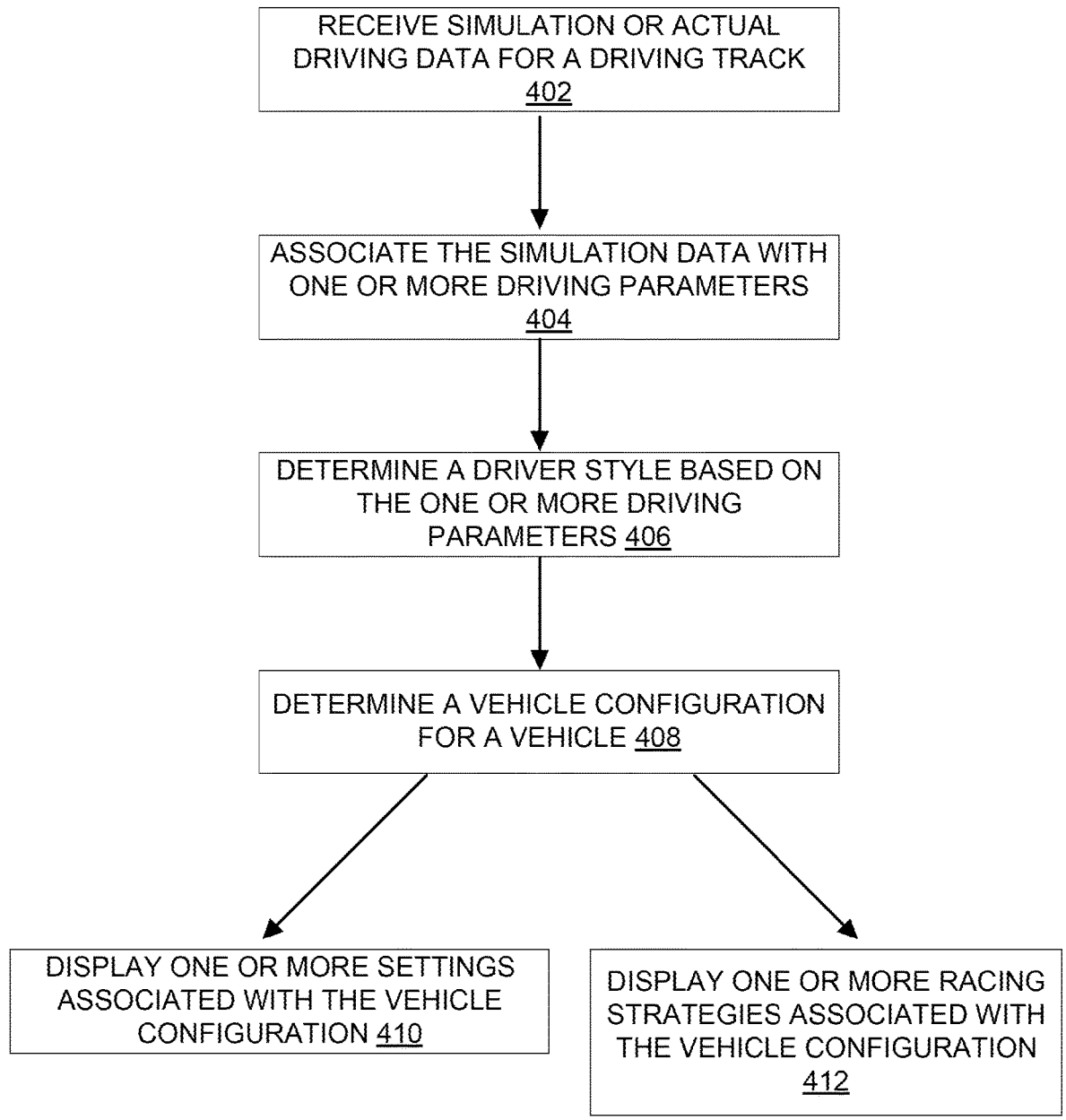
FIG. 4 illustrates an example method for generating driving recommendations based on driving style.

FIG. 4 illustrates an example method incorporating the system described above in FIGS. 1-3. At block 402, the system can receive simulation or actual driving data for a driving track. As described above, data can include vehicle and driver data collected from a simulation of the race and/or practice driving around the physical track. This data can indicate various different driver preferences as a driver operates a vehicle or a simulation of a vehicle. Furthermore, the user interface can continue collecting data from drills or practice runs to further tailor the driver's model as necessary.

At block 404, the system can associate the simulation data with one or more driving parameters. As described above in FIG. 3, parameters can together form a profile or model representing the driver's style. These parameters may vary and include additional or less parameters as necessary. Some examples of parameters can include, but are not limited to, driver aggression, vehicle set up, vehicle state, trajectory of course, preference for corners, biometric data, level of experience, recorded lap time, and/or consistency.

At block 406, the system can determine a driver style based on one or more parameters associated with the driver and/or vehicle data. As described above in FIG. 3, the driver's style can incorporate various parameters that indicate a driver's preference, comfort, or priorities. The driver's style can be determined from one or a combination of vehicle data and driver data.

The system can input the vehicle and/or driver data and determined driver style into a reinforced learning model. As described above, the driving style parameters and parameters affecting vehicle performance can be input into one or more machine learning models. These models can incorporate mathematical models to minimize the lap time. The models can also compare the driver's actions to expert driver data. The reinforced learning model can incorporate the individual driver data as described above to provide recommendations for vehicle setup or racing strategies. The reinforced learning model can be tailored to one specific track at a time for increased accuracy of the parameters. In some embodiments, the model can incorporate meta learning to adjust those parameters to fit various different racing tracks. The system can take the recommendations for a particular racing track and determine how the driver would act in a different racing scenario. The model can be trained and updated with additional vehicle and driver data as necessary.

At block 408, the system can determine a vehicle configuration for a vehicle. As described above, the vehicle configuration can include recommendations for vehicle settings based on the machine learning models. The settings can be tailored to an individual driver. At block 410, the system may provide a listing of vehicle settings for the vehicle configuration. These settings can include tire types, camber, caster toe, suspension and anti-roll bar settings, brake bias, and wing and splitter configurations. Alternatively or in addition, at block 412, the system can provide racing strategies for the driver to follow as the race progresses. The recommendations can be displayed on a user interface so that the driver can adjust vehicle settings. These recommendations and trajectory can be displayed on any user interface, including on an online interface, a mobile application, computer software, GPS, or other display.

Figure 5:
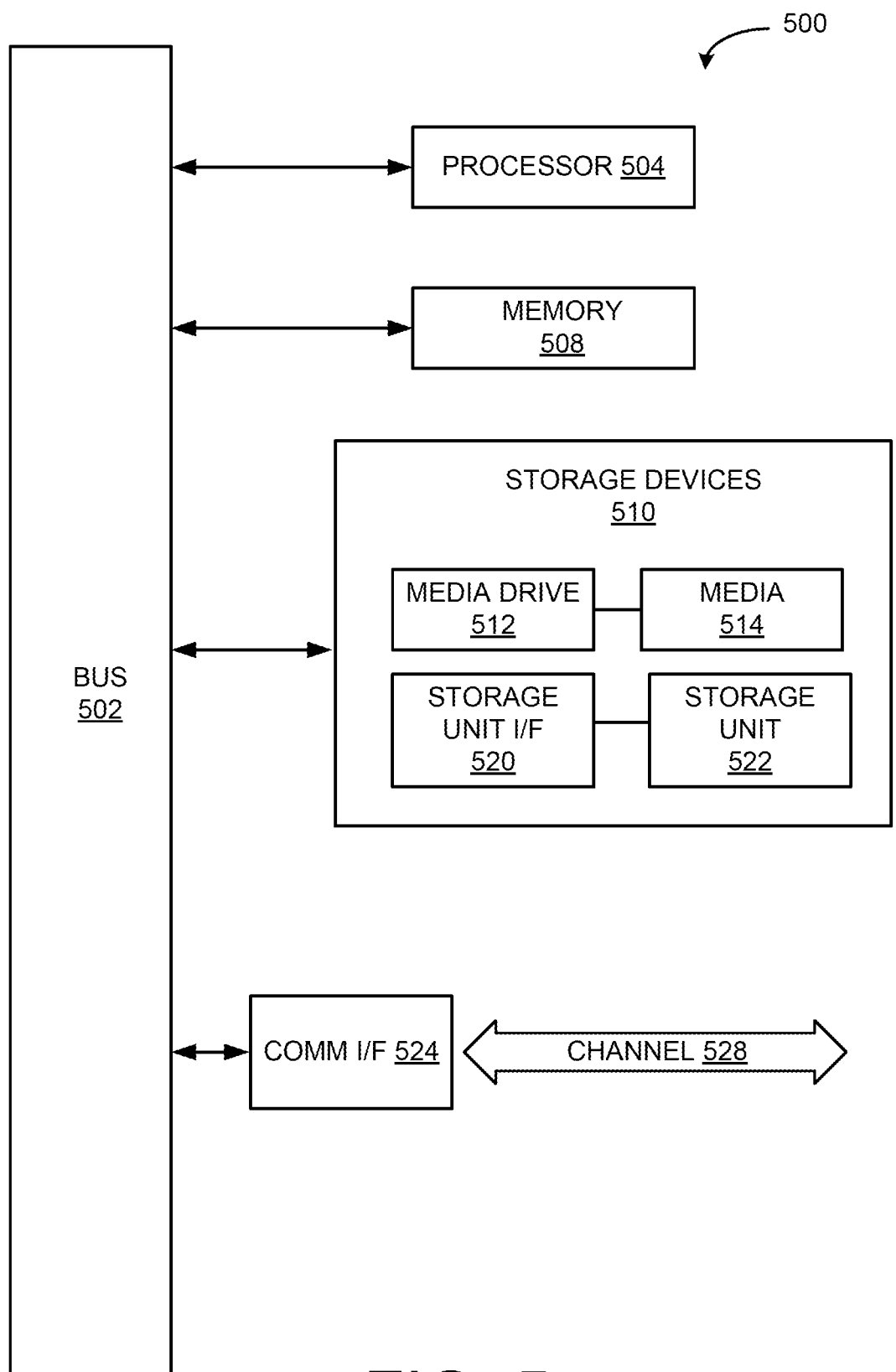
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for determining vehicle configurations, comprising:
   receiving simulation data or actual driving data of a driving track corresponding to a driver;
   associating the simulation data or actual driving data with one or more driving parameters;
   determining a driver style based on the one or more driving parameters;
   determining a vehicle configuration for a vehicle of the driver based on the determined driver style; and
   displaying one or more vehicle settings associated with the vehicle configuration on a user interface.

2. The method of claim 1, wherein the one or more driving parameters comprise level of aggression, preference for corners, passing preferences, and driver experience.

3. The method of claim 1, further comprising comparing the simulation data or actual driving data with driving data associated with an expert driver.

4. The method of claim 1, wherein the actual driving data comprises biometric data.

5. The method of claim 4, wherein the biometric data comprises heart rate, perspiration rate, and eye movement.

6. The method of claim 1, wherein determining the vehicle configuration is based on minimizing a lap time around the driving track.

7. The method of claim 1, wherein the vehicle configuration corresponds to a different driving track.

8. The method of claim 1, further comprising training a reinforced learning model based on the vehicle configuration.

9. A method for determining vehicle operating characteristics, comprising:
   receiving simulation data or actual driving data of a driving track corresponding to a driver;
   associating the simulation data or actual driving data with one or more driving parameters;
   determining a driver style based on the one or more driving parameters;
   comparing the driver style to expert driving data;
   determining a vehicle configuration for a vehicle of the driver based on the comparison; and
   displaying one or more racing strategies associated with the vehicle configuration on a user interface.

10. The method of claim 9, wherein the one or more driving parameters comprise level of aggression, preference for corners, passing preferences, and driver experience.

11. The method of claim 9, wherein the actual driving data comprises biometric data.

12. The method of claim 11, wherein the biometric data comprises heart rate, perspiration rate, and eye movement.

13. The method of claim 9, wherein determining the vehicle configuration is based on minimizing a lap time around the driving track.

14. The method of claim 9, further comprising training a reinforced learning model based on the one or more racing strategies.

15. A non-transitory machine-readable medium having instructions stored therein, which when executed by a processor, cause the processor to:
   receive biometric driving data of a driving track corresponding to a driver;
   associate the biometric driving data with one or more driving parameters;
   determine a driver style based on the one or more driving parameters;
   determine a vehicle configuration for a vehicle of the driver based on the determined driver style and a minimal lap time around the driving track; and
   display one or more vehicle settings associated with the vehicle configuration on a user interface.

16. The non-transitory machine-readable medium of claim 15, wherein the one or more driving parameters comprise level of aggression, preference for corners, passing preferences, and driver experience.

17. The non-transitory machine-readable medium of claim 15, wherein the instructions further cause the processor to compare the biometric driving data with driving data associated with an expert driver.

18. The non-transitory machine-readable medium of claim 15, wherein the biometric driving data comprises heart rate, perspiration rate, and eye movement.

19. The non-transitory machine-readable medium of claim 15, wherein the vehicle configuration corresponds to a different driving track.

20. The non-transitory machine-readable medium of claim 15, wherein the instructions further cause the processor to train the reinforced learning model based on the vehicle configuration.

* * * * *